US009553665B2

(12) United States Patent
Kim et al.

(10) Patent No.: US 9,553,665 B2
(45) Date of Patent: Jan. 24, 2017

(54) APPARATUS AND METHOD FOR DETECTING OPTICAL LINE FAULT IN PASSIVE OPTICAL NETWORK

(71) Applicant: ELECTRONICS AND TELECOMMUNICATIONS RESEARCH INSTITUTE, Daejeon (KR)

(72) Inventors: Sung-Chang Kim, Gwangju (KR); Hark Yoo, Gwangju (KR); Geun-Yong Kim, Gwangju (KR); Dong-Soo Lee, Gwangju (KR); Hee-Do Kim, Gwangju (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 66 days.

(21) Appl. No.: 14/620,340

(22) Filed: Feb. 12, 2015

(65) Prior Publication Data

US 2015/0229389 A1 Aug. 13, 2015

(30) Foreign Application Priority Data

Feb. 13, 2014 (KR) ........................ 10-2014-0016598

(51) Int. Cl.
*H04B 10/08* (2006.01)
*H04B 10/073* (2013.01)
(Continued)

(52) U.S. Cl.
CPC ........ *H04B 10/073* (2013.01); *H04B 10/0771* (2013.01); *H04B 10/0773* (2013.01); *H04J 14/02* (2013.01)

(58) Field of Classification Search
CPC ... H04B 10/071; H04B 10/0771; H04B 10/07; H04B 10/073; H04B 10/0791; H04B 10/075; H04B 10/0795
(Continued)

(56) References Cited

U.S. PATENT DOCUMENTS 9,042,723 B2 * 5/2015 Dahlfort .............. H04B 10/071
398/10
2006/0110161 A1 5/2006 Cho et al.
(Continued)

FOREIGN PATENT DOCUMENTS

KR 10-2005-0092680 9/2005
KR 10-2009-0100109 9/2009
(Continued)

*Primary Examiner* — Hanh Phan
(74) *Attorney, Agent, or Firm* — Kile Park Reed & Houtteman PLLC

(57) ABSTRACT

Disclosed herein is an apparatus and method for detecting an optical line fault in a Passive Optical Network (PON). The apparatus includes an optical distribution unit configured to, when a multiplexed signal of a downstream light signal and a monitoring light signal is input, distribute the multiplexed signal to an Optical Network Unit (ONU) of a first optical path and to a second optical path. An optical layer management unit is installed in the second optical path and is configured to set a time at which the monitoring light signal of the multiplexed signal provided to the second optical path is received to a starting time of monitoring light measurement, compare a monitoring light signal reflected and returned from the ONU with a signal pattern obtained when no fault occurs, and then determine whether a fault has occurred in a distribution network.

18 Claims, 6 Drawing Sheets

(51) Int. Cl.
*H04J 14/02* (2006.01)
*H04B 10/077* (2013.01)
(58) Field of Classification Search
USPC ............. 398/16, 17, 21, 72, 100, 68, 33, 38, 13,398/10, 79, 22, 23, 20; 356/73.1
See application file for complete search history.

(56) References Cited

U.S. PATENT DOCUMENTS

2012/0039598 A1  2/2012  Dahlfort
2013/0259469 A1* 10/2013  Smith ................. H04J 14/0227
                                                           398/16

FOREIGN PATENT DOCUMENTS

KR   10-2011-0061254   6/2011
KR   10-2012-0030397   3/2012

\* cited by examiner

APPARATUS AND METHOD FOR DETECTING OPTICAL LINE FAULT IN PASSIVE OPTICAL NETWORK

CROSS REFERENCE TO RELATED APPLICATION

This application claims the benefit of Korean Patent Application No. 10-2014-0016598 filed Feb. 13, 2014, which is hereby incorporated by reference in its entirety into this application.

BACKGROUND OF THE INVENTION

1. Technical Field

The present invention relates generally to an apparatus and method for detecting an optical line fault in a Passive Optical Network (PON) and, more particularly, to an apparatus and method that are capable of detecting an optical line fault at the smart Remote Node (RN) of a PON.

2. Description of the Related Art

Due to mobile data traffic that has recently and explosively increased, attempts to implement wired/wireless networks as broadband networks, long-range networks, and highly-integrated networks have been actively conducted. In particular, in the field of a wired optical network, 1G Ethernet-PON (E-PON) technology and 2.5G Gigabit-PON (G-PON) technology have been commercialized and are now widely available in private homes. Further, it is expected that the standardization of 10G E-PON technology and 10 Gigabit-PON (XG-PON) technology will be completed and commercialized in the near future.

In this way, as optical network technology has rapidly evolved into broadband network technology, the strengthening of network maintenance functions for providing reliable services is necessarily required. From the standpoint of an optical layer, to improve the availability and reliability of networks, the occurrence of faults in an optical module and an optical line must be monitored in real time. Further, if faults have occurred, they must be detected within a short period of time and must be promptly recovered.

Generally, PON technology may be chiefly divided into time division multiplexing-PON (hereinafter referred to as "TDM-PON") and wavelength division multiplexing-PON (hereinafter referred to as "WDM-PON"), based on a data multiplexing scheme. For respective PON technologies, the configurations and operation schemes of various optical line monitoring devices have been proposed.

One of schemes that are currently and widely used as systems for monitoring faults occurring in an optical link is a scheme using an Optical Time Domain Reflectometer (OTDR) system. Generally, this adopts a scheme in which an OTDR system is located at a central base station and monitoring light is transmitted to Optical Network Units (ONUs) using a wavelength differing from that of data used in an Optical Line Terminal (or Termination) (OLT), and in which the occurrence or non-occurrence of faults in distribution lines of the respective ONUs is determined based on the distribution waveforms of light components, reflected and received from the ONUs, on a time axis.

However, a line fault detection system using an OTDR system in the PON has several structural problems that need to be solved. First, a remote node is present in the PON structure, an Optical Power Splitter (OPS) is present in the TDM-PON, and an Arrayed Waveguide Grating (AWG) is present in the WDM-PON, thus functioning to distribute optical signals. In the case of OTDR monitoring light, there is a disadvantage in that it is very difficult to distinguish a reflected and returned optical signal from noise due to loss in a Remote Node (RN). As the length of an optical line has increased, such a phenomenon has become an increasing problem. Second, the PON structure is divided into feeder networks and distribution networks, but it is impossible to identify the distribution networks because monitoring light is summed in the case of ONUs present at the same distance. In order to solve this problem, there is a need to artificially set the distances of ONUs to different distances. However, this setting complicates the embedding and installation of distribution networks, thus increasing construction costs.

To date, various methods, such as a monitoring light encoding method and a wavelength variable OTDR, have been proposed to solve the above-described two problems, but they have low economic efficiency and low universality.

Therefore, an efficient optical layer management method and system are urgently required that are universally usable for TDM-PON and WDM-PON structures while solving the above-described two problems in the PON structure, that is, difficulty in the identification of monitoring light due to loss in a remote node and an optical line and the overlapping of OTDR signals caused by ONUs present at the same distance.

The background of a smart RN structure proposed in the present invention is given as follows: conventional technology is intended to simplify the operation and management of the network by configuring an RN using only passive elements if possible, but line management of an Optical Distribution Network (ODN) cannot be performed in real time due to the RN composed of only passive elements. Recently, for real-time management of an ODN, the use of active elements for ODN management is required in such a way as to use a Light Emitting Diode (LED) for indicating connection status on an optical distribution board and to use Radio Frequency Identification (RFID) and a Quick Response (QR) code for determining information of connections between optical fibers.

Consequently, the conventional technology is problematic in that it is difficult to distinguish a monitoring light signal from a noise signal due to loss occurring in an optical line and an RN, and it is also difficult to identify a distribution network due to the overlapping of monitoring light waveforms caused by ONUs present at the same distance.

As related preceding technology, Korean Patent Application Publication No. 2009-0100109 (entitled "Optical Fiber Monitoring Apparatus and Method Using Optical Pulse Pattern") is disclosed. This patent discloses technology in which the pulse of reflected light measured at the optical cable of a subscriber-side optical network is compared with a previously measured normal state pulse to check the pulse pattern of the reflected light, and the state of a fault in the optical cable is inspected based on the pulse pattern of the reflected light, thus easily determining the fault state of the optical cable (e.g., occurrence or non-occurrence of a fault, a faulty cable, and a predicted faulty location).

As another related technology, Korean Patent Application Publication No. 2012-0030397 (entitled "Method and Apparatus for Fault Discovery in Passive Optical Network (PON)") discloses technology for discovering a fault in an optical fiber in a PON.

SUMMARY OF THE INVENTION

Accordingly, the present invention has been made keeping in mind the above problems occurring in the prior art, and an object of the present invention is to provide an apparatus and method for detecting an optical line fault in a PON, which can effectively solve conventional problems via a smart remote node including an optical layer management function and can be universally used in networks such as a TDM-PON and a WDM-PON.

In accordance with an aspect of the present invention to accomplish the above object, there is provided an apparatus for detecting an optical line fault in a Passive Optical Network (PON), including an optical distribution unit configured to, when a multiplexed signal of a downstream light signal and a monitoring light signal is input, distribute the multiplexed signal to an Optical Network Unit (ONU) of a first optical path and to a second optical path; and an optical layer management unit installed in the second optical path, and configured to set a time at which the monitoring light signal of the multiplexed signal provided to the second optical path is received to a starting time of monitoring light measurement, compare a monitoring light signal reflected and returned from the ONU with a signal pattern obtained when no fault occurs, and then determine whether a fault has occurred in a distribution network.

The optical distribution unit may include a power splitter and a monitoring light receiving filter unit, the power splitter transmits the multiplexed signal both to the monitoring light receiving filter unit and to the optical layer management unit, and the monitoring light receiving filter unit transmits the multiplexed signal received from the power splitter to the ONU, and transmits a monitoring light signal reflected and returned from the ONU to the optical layer management unit.

The optical distribution unit including the power splitter and the monitoring light receiving filter unit may be integrated into a Planar Lightwave Circuit (PLC) chipset and implemented as a single chipset.

The optical layer management unit may set a time at which the monitoring light signal of the multiplexed signal provided to the second optical path is received to a measurement starting time, and measure the intensity and time of a monitoring light signal reflected and returned from the ONU. In this case, a waveform of monitoring light reflected and obtained from each ONU is compared with a waveform of monitoring light in a normal state, thus determining whether a fault has occurred in a distribution network.

The optical layer management unit may store results of determining whether a fault has occurred in the distribution network, and transmit the determination results to an optical distribution network management device.

The optical layer management unit may include a PON Media Access Control (MAC) unit to transmit the results of determining whether a fault has occurred in the distribution network to the optical distribution network management device via in-band signaling.

The optical layer management unit may include a wireless communication unit to transmit the results of determining whether a fault has occurred in the distribution network to the optical distribution network management device via out-of-band signaling.

The downstream light signal may be output from an Optical Line Terminal (OLT) in a central base station, and the monitoring light signal may be output from a monitoring light generation device in the central base station.

In accordance with another aspect of the present invention to accomplish the above object, there is provided an apparatus for detecting an optical line fault in a Passive Optical Network (PON), including an optical distribution unit configured to multiplex a downstream light signal and a monitoring light signal, transmit a multiplexed signal to an Optical Network Unit (ONU) of a first optical path, and transmit a monitoring light signal reflected and returned from the ONU to a second optical path in order to detect a fault in a distribution network, and configured to multiplex an upstream light signal from the ONU and the monitoring light signal, transmit a multiplexed signal to an Optical Line Terminal (OLT), and transmit a monitoring light signal reflected and returned from the OLT to the second optical path in order to detect a fault in a feeder network; and an optical layer management unit installed in the second optical path, and configured to switch a current mode to any one of a fault detection mode for the distribution network and a fault detection mode for the feeder network, wherein the optical layer management unit compares the reflected and returned monitoring light signal with a pattern of a monitoring light signal measured when no fault occurs, and then determines whether a fault has occurred in the distribution network and in the feeder network.

The optical distribution unit may include a first Arrayed Waveguide Grating (AWG) for multiplexing the upstream light signal and the monitoring light signal to detect a fault in the feeder network; a second AWG for multiplexing the downstream light signal and the monitoring light signal to detect a fault in the distribution network; a power splitter for distributing the signal multiplexed by the second AWG to the distribution network; a monitoring light receiving filter for receiving the monitoring light signal reflected and returned from the ONU and providing the received monitoring light signal to the optical layer management unit; and a monitoring light blocking filter for blocking wavelength of monitoring light of the multiplexed signal input through the power splitter.

The optical distribution unit including the first AWG, the second AWG, the monitoring light receiving filter, the power splitter, and the monitoring light blocking filter may be integrated into a Planar Lightwave Circuit (PLC) chip and implemented as a single chipset.

The optical layer management unit may set a time at which the monitoring light signal used for multiplexing is received to a measurement starting time, and measure the intensity and time of the reflected and returned monitoring light signal. Here, a waveform of the reflected and returned monitoring light is compared with a waveform of monitoring light in a normal state, thus determining whether a fault has occurred in the distribution network and in the feeder network.

The optical layer management unit may store results of determining whether a fault has occurred in the distribution network and in the feeder network, and transmit the determination results to an optical distribution network management device.

The optical layer management unit may include an optical switch configured to switch to any one of a fault detection mode for the distribution network and a fault detection mode for the feeder network; and a PON MAC unit configured to transmit information about results of determining whether a fault has occurred in the distribution network and in the feeder network to an optical distribution network management device via in-band signaling.

The optical layer management unit may include an optical switch configured to switch to any one of a fault detection mode for the distribution network and a fault detection mode for the feeder network; and a wireless communication unit configured to transmit information about results of determining whether a fault has occurred in the distribution network and in the feeder network to an optical distribution network management device via out-of-band signaling.

The downstream light signal may be output from an OLT in a central base station, and the monitoring light signal may be output from the optical layer management unit.

In accordance with a further aspect of the present invention to accomplish the above object, there is provided a method for detecting an optical line fault in a Passive Optical Network (PON), including switching, by an optical layer management unit, a current mode to any one of a fault detection mode for a distribution network and a fault detection mode for a feeder network; when the current mode switches to the fault detection mode for the distribution network, multiplexing, by an optical distribution unit, a downstream light signal and a monitoring light signal, transmitting a multiplexed signal to an Optical Network Unit (ONU), and transmitting a monitoring light signal reflected and returned from the ONU to the optical layer management unit; when the current mode switches to the fault detection mode for the feeder network, multiplexing, by the optical distribution unit, an upstream light signal from the ONU and the monitoring light signal, transmitting a multiplexed signal to an Optical Line Terminal (OLT), and transmitting a monitoring light signal reflected and returned from the OLT to the optical layer management unit; and comparing, by the optical layer management unit, the reflected and returned monitoring light signal with a pattern of a monitoring light signal measured when no fault occurs, thus determining whether a fault has occurred in the distribution network and in the feeder network.

The method may further include transmitting, by the optical layer management unit, results of determining whether a fault has occurred in the distribution network and in the feeder network to an optical distribution network management device via in-band signaling.

The method may further include transmitting, by the optical layer management unit, results of determining whether a fault has occurred in the distribution network and in the feeder network to an optical distribution network management device via out-of-band signaling.

In addition to the above-described method for detecting an optical line fault in a PON according to the aspects of the present invention, the present invention may employ a method including distributing, by an optical distribution unit, a multiplexed signal of a downstream light signal and a monitoring light signal to an ONU of a first optical path and to a second optical path; receiving, by the optical distribution unit, monitoring light reflected and returned from the ONU and transmitting the monitoring light to an optical layer management unit of the second optical path; and comparing, by the optical layer management unit, a monitoring light signal reflected and returned from the ONU with the monitoring light signal of the multiplexed signal provided to the second optical path, thus determining whether a fault has occurred in a distribution network.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Figure 1:
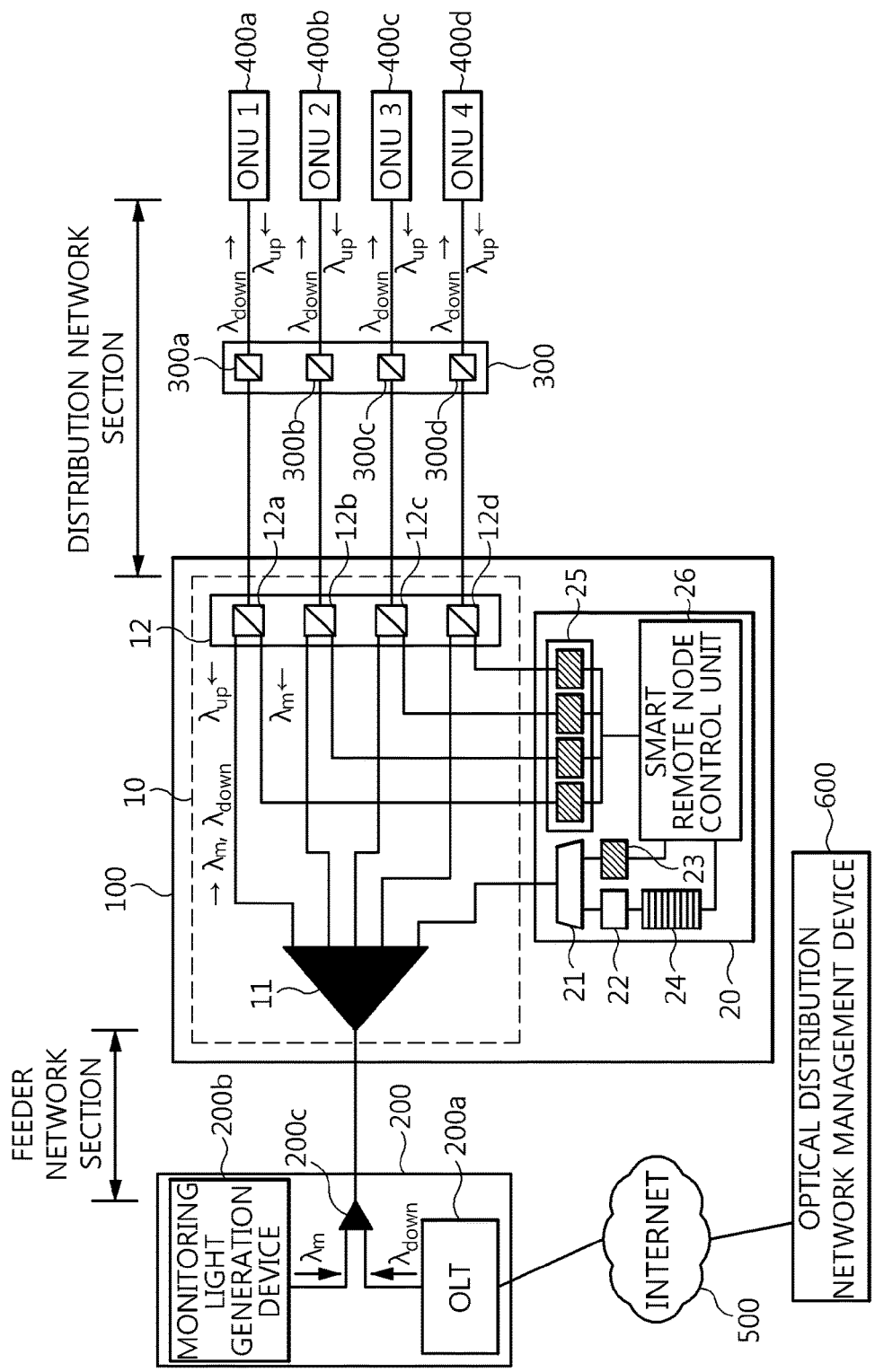
FIG. 1 is a diagram showing an apparatus for detecting an optical line fault in a PON according to a first embodiment of the present invention.

The present invention may be variously changed and may have various embodiments, and specific embodiments will be described in detail below with reference to the attached drawings.

However, it should be understood that those embodiments are not intended to limit the present invention to specific disclosure forms and they include all changes, equivalents or modifications included in the spirit and scope of the present invention.

The terms used in the present specification are merely used to describe specific embodiments and are not intended to limit the present invention. A singular expression includes a plural expression unless a description to the contrary is specifically pointed out in context. In the present specification, it should be understood that the terms such as "include" or "have" are merely intended to indicate that features, numbers, steps, operations, components, parts, or combinations thereof are present, and are not intended to exclude a possibility that one or more other features, numbers, steps, operations, components, parts, or combinations thereof will be present or added.

Unless differently defined, all terms used here including technical or scientific terms have the same meanings as the terms generally understood by those skilled in the art to which the present invention pertains. The terms identical to those defined in generally used dictionaries should be interpreted as having meanings identical to contextual meanings of the related art, and are not interpreted as being ideal or excessively formal meanings unless they are definitely defined in the present specification.

Embodiments of the present invention will be described in detail with reference to the accompanying drawings. In the following description of the present invention, the same reference numerals are used to designate the same or similar elements throughout the drawings and repeated descriptions of the same components will be omitted.

FIG. 1 is a diagram showing an apparatus for detecting an optical line fault in a PON according to a first embodiment of the present invention.

The optical line fault detection apparatus according to the first embodiment of the present invention adopts the structure of a smart remote node based on monitoring light-centralized in-band communication.

A smart remote node 100 shown in FIG. 1 may be the optical line fault detection apparatus according to the first embodiment of the present invention.

The smart remote node 100 includes an optical distribution unit 10 and an optical layer management unit 20.

The optical distribution unit 10 receives a multiplexed signal (i.e., a multiplexed signal of downstream light ($\lambda_{down}$) and monitoring light ($\lambda_m$)) from a central base station 200, and distributes the multiplexed signal to Optical Network Units (ONUs) 400a, 400b, 400c, and 400d and to the optical layer management unit 20.

Further, the optical distribution unit 10 sends monitoring light, reflected and returned from the ONUs 400a, 400b, 400c, and 400d, to the optical layer management unit 20. More specifically, a monitoring light reflective filter unit 300 composed of monitoring light reflective filters 300a, 300b, 300c, and 300d is installed at the location previous to the ONUs 400a, 400b, 400c, and 400d. Accordingly, when the multiplexed signal is applied to the ONUs 400a, 400b, 400c, and 400d, the monitoring light signal of the multiplexed signal is reflected from the monitoring light reflective filter unit 300 and is then returned to the optical distribution unit 10. The optical distribution unit 10 at this time sends the returned monitoring light signal to the optical layer management unit 20.

In FIG. 1, although the monitoring light reflective filter unit 300 (including filters 300a, 300b, 300c, and 300d) and the ONUs 400a, 400b, 400c, and 400d are shown as separate components, respective monitoring light reflective filters may be installed in portions of the corresponding ONUs in such a way as that the monitoring light reflective filter 300a, for example, is installed in a portion of the ONU 400a.

Preferably, the optical distribution unit 10 includes a power splitter 11 for performing 1:N+1 branching (where N denotes the number of ONUs, and N=4 in FIG. 1) on the multiplexed signal received from the central base station 200; and a monitoring light receiving filter unit 12 composed of a plurality of monitoring light receiving filters 12a, 12b, 12c, and 12d that have different phase arrays and that perform 2:1 branching.

That is, the power splitter 11 may transmit the multiplexed signal (i.e., the signal including the downstream light ($\lambda_{down}$) and the monitoring light ($\lambda_m$)) to the plurality of monitoring light receiving filters 12a, 12b, 12c, and 12d while transmitting the multiplexed signal to the optical layer management unit 20.

Further, the monitoring light receiving filter unit 12 transmits the multiplexed signal (i.e., the signal including the downstream light ($\lambda_{down}$) and the monitoring light ($\lambda_m$)) received from the power splitter 11 to the ONUs 400a, 400b, 400c, and 400d, and sends the monitoring light signal reflected and returned from the monitoring light reflective filter unit 300 to the optical layer management unit 20. Meanwhile, the monitoring light receiving filter unit 12 transmits upstream light ($\lambda_{up}$) from the ONUs 400a, 400b, 400c, and 400d to the OLT 200a of the central base station 200 through the power splitter 11.

In the above-described smart remote node 100, the optical distribution unit 10 including the power splitter 11 and the monitoring light receiving filter unit 12 may be integrated into a Planar Lightwave Circuit (PLC) chipset and implemented as a single chipset.

Meanwhile, the optical layer management unit 20 analyzes the monitoring light based on the multiplexed signal (including the downstream light ($\lambda_{down}$) and the monitoring light ($\lambda_m$)) input through the power splitter 11 and the monitoring light signal (i.e., the monitoring light signal reflected and returned from the monitoring light reflective filter unit 300) input through the monitoring light receiving filter unit 12, and then determines whether a fault has occurred in each distribution network. More specifically, the optical layer management unit 20 sets the time at which the monitoring light ($\lambda_m$) of the multiplexed signal input through the power splitter 11 is received to a measurement starting time. Accordingly, the optical layer management unit 20 may compare data, obtained by measuring the intensity and time of the monitoring light reflected and returned from each of the ONUs 400a, 400b, 400c, and 400d, with a reference signal pattern in a normal state and then analyze and determine whether a fault has occurred in each distribution network.

Here, the optical layer management unit 20 includes an Arrayed Waveguide Grating (AWG) 21, an optical transceiver 22, a monitoring light receiver 23, a PON Media Access Control (MAC) unit 24, monitoring light receivers 25, and a smart remote node control unit 26. The AWG 21 divides the multiplexed signal (including the downstream light ($\lambda_{down}$) and the monitoring light ($\lambda_m$)) input through the power splitter 11 into a data wavelength and a monitoring light wavelength, and transmits data from the optical transceiver 22 (e.g., distribution network status information) to the power splitter 11 so that the data is transmitted to an optical distribution network management device 600. The optical transceiver 22 receives the data wavelength divided by the AWG 21 and transmits data input through the PON MAC unit 24 (e.g., distribution network status information) to the power splitter 21 through the AWG 21 so that the input data is transmitted to the optical distribution network management device 600. The monitoring light receiver 23 receives the monitoring light wavelength divided by the AWG 21. The PON MAC unit 24 transmits and receives data (i.e., data for in-band communication). The monitoring light receivers 25 receive monitoring light for respective distribution networks. The smart remote node control unit 26 analyzes and determines whether a fault has occurred in each distribution network, based on the reception time of the monitoring light input through the AWG 21 and the monitoring light receiver 23 and the data of the monitoring light (time, intensity, etc.) input through the monitoring light receivers 25.

In FIG. 1, the central base station 200 includes the OLT 200a, a monitoring light generation device 200b, and a coupler 200c.

The OLT 200a may generate and output a downstream light ($\lambda_{down}$) signal and receive an upstream light ($\lambda_{up}$) signal.

The monitoring light generation device 200b may generate and output monitoring light ($\lambda_m$) having a wavelength differing from the data wavelengths (i.e., $\lambda_{down}$ and $\lambda_{up}$). Here, the data wavelengths (i.e., $\lambda_{down}$ and $\lambda_{up}$) are used between the OLT 200a and the ONUs 400a, 400b, 400c, and 400d.

The coupler 200c multiplexes the downstream light ($\lambda_{down}$) signal from the OLT 200a and the monitoring light ($\lambda_m$) signal from the monitoring light generation device 200b, transmits a multiplexed signal to the smart remote node 100, receives the upstream light ($\lambda_{up}$) signal input through the smart remote node 100, and transmits the upstream light ($\lambda_{up}$) to the OLT 200a.

The above-described central base station 200 is connected to the optical distribution network management device 600 over a network such as the Internet 500.

The smart remote node 100 based on monitoring light-centralized in-band communication, shown in FIG. 1 is advantageous in that the monitoring light generation device is located in the central base station 200, thus enabling the network management to be easily managed and enabling a plurality of PON links to be connected to the monitoring light generation device. Further, the monitoring light passes downstream only once through the optical distribution unit 10, thus reducing optical loss. Furthermore, the monitoring light receivers 25 are attached to respective distribution networks, thus precisely determining a fault occurring in a specific distribution network.

Figure 2:
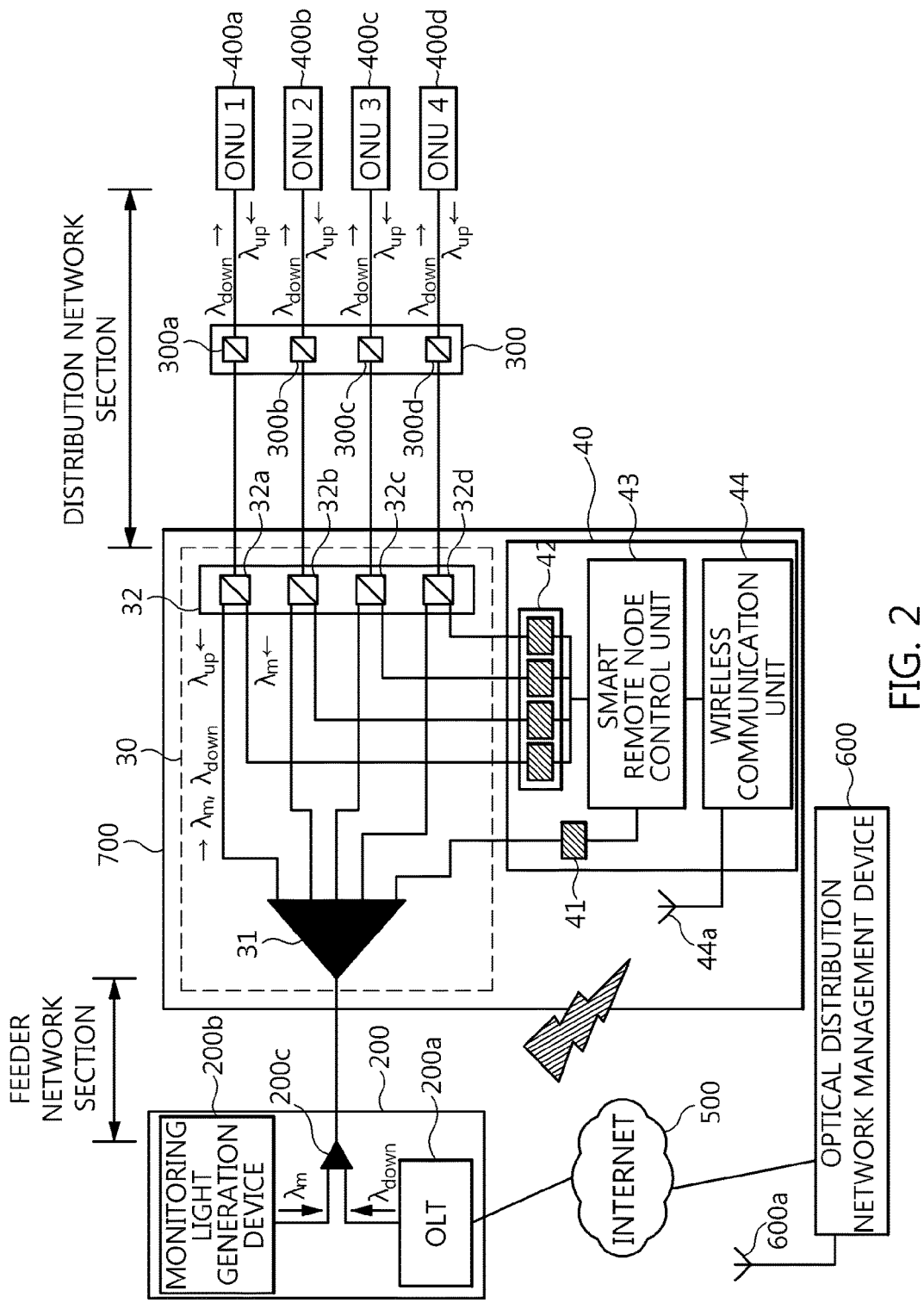
FIG. 2 is a diagram showing an apparatus for detecting an optical line fault in a PON according to a second embodiment of the present invention.

FIG. 2 is a diagram showing an apparatus for detecting an optical line fault in a PON according to a second embodiment of the present invention. The same reference numerals are used to designate the components of FIG. 2 identical to those of FIG. 1, and thus a repeated description thereof will be omitted.

The above-described optical line fault detection apparatus according to the first embodiment of the present invention adopts the structure of a smart remote node based on monitoring light-centralized in-band communication, whereas the optical line fault detection apparatus according to the second embodiment of the present invention adopts the structure of a smart remote node based on monitoring light-centralized out-of-band communication.

A smart remote node 700 shown in FIG. 2 may be the optical line fault detection apparatus according to the second embodiment of the present invention.

In the second embodiment, the smart remote node 700 is configured such that the AWG 21, the optical transceiver 22 for data transmission/reception, and the PON MAC unit 24 of FIG. 1 are removed, and a wireless communication unit 44 is added.

That is, the smart remote node 700 includes an optical distribution unit 30 and an optical layer management unit 40.

Here, similar to the optical distribution unit 10 according to the first embodiment, the optical distribution unit 30 includes a power splitter 31 and a monitoring light receiving filter unit 32 composed of monitoring light receiving filters 32*a*, 32*b*, 32*c*, and 32*d*.

Although the reference numerals of the power splitter 31 and the monitoring light receiving filter unit 32 of FIG. 2 are different from those of the power splitter 11 and the monitoring light receiving filter unit 12 of FIG. 1, the functions of the corresponding components are identical to each other.

The optical layer management unit 40 analyzes monitoring light based on a multiplexed signal (i.e., a signal including downstream light ($\lambda_{down}$) and monitoring light ($\lambda_m$)) input through the power splitter 31 and a monitoring light signal (i.e., a monitoring light signal reflected and returned from a monitoring light reflective filter unit 300) input through the monitoring light receiving filter unit 32, and then determines whether a fault has occurred in each distribution network. More specifically, the optical layer management unit 40 uses the time, at which the monitoring light ($\lambda_m$) signal of the multiplexed signal input through the power splitter 31 is received, as a measurement starting time. Accordingly, the optical layer management unit 40 may compare data obtained by measuring the intensity and time of the monitoring light reflected and returned from each of the ONUs 400*a*, 400*b*, 400*c*, and 400*d* with a pattern in a normal state (i.e., a state in which no fault occurs in the line of each optical distribution network), and then analyze and determine whether a fault has occurred in each distribution network.

Here, the optical layer management unit 40 includes a multiplexed signal receiver 41 for receiving the multiplexed signal through the power splitter 31; monitoring light receivers 42 for receiving monitoring light for respective distribution networks; a smart remote node control unit 43 for analyzing and determining whether a fault has occurred in each distribution network, based on the monitoring light of the multiplexed signal input through the multiplexed signal receiver 41 and the monitoring light input through the monitoring light receivers 42; and a wireless communication unit 44 for wirelessly transmitting in real time the status information of each distribution network indicating the results of the analysis by the smart remote node control unit 43 to the optical distribution network management device 600.

The wireless communication unit 44 transmits only status information which is newly updated to the optical distribution network management device 600 over a cellular network.

For wireless communication, the wireless communication unit 44 may include an antenna 44*a*, and the optical distribution network management device 600 may also include an antenna 600*a*.

Figure 3:
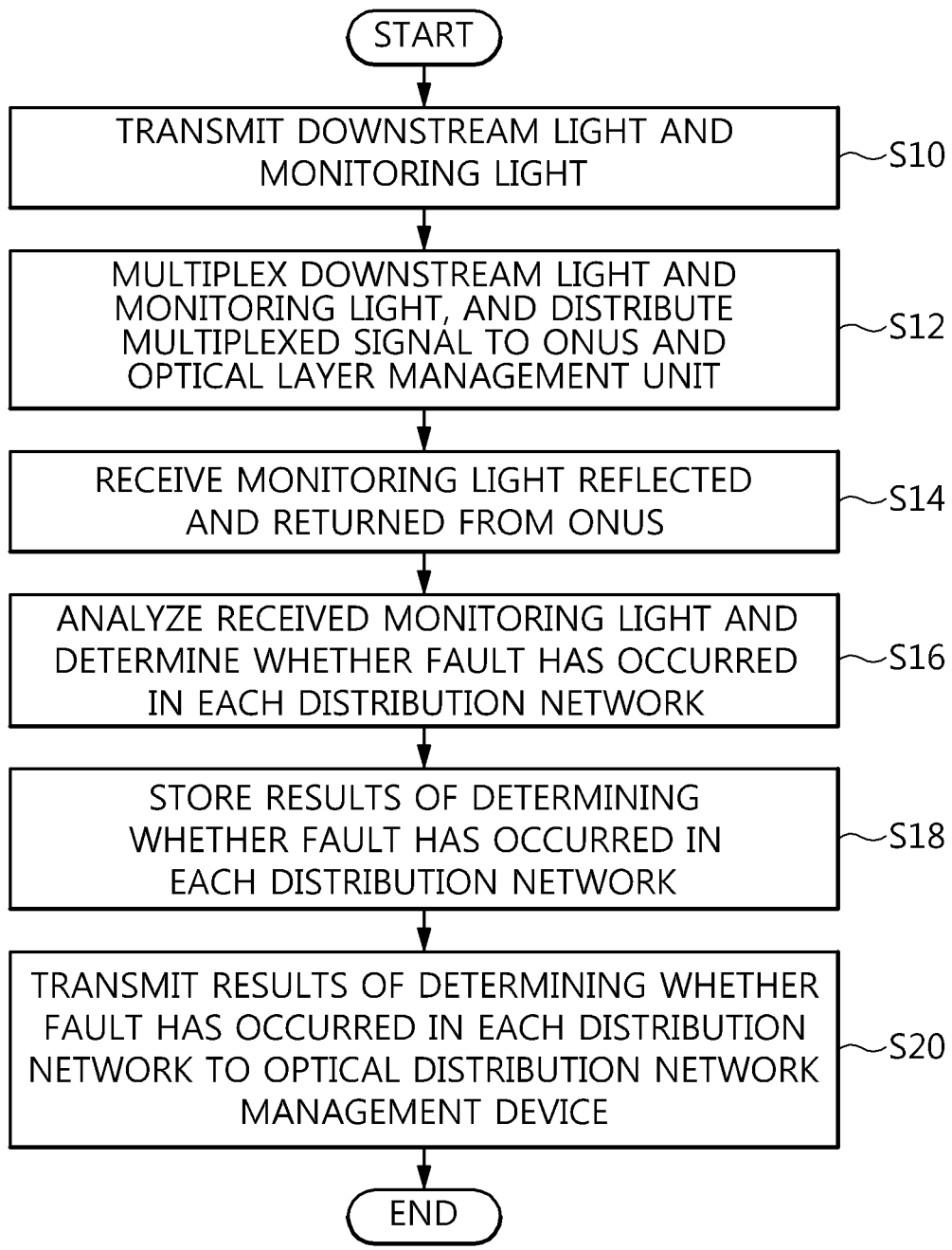
FIG. 3 is a flowchart showing the operation of the apparatus for detecting an optical line fault in a PON according to the first or second embodiment of the present invention.

FIG. 3 is a flowchart showing the operation of the apparatus for detecting an optical line fault in a PON according to the first or second embodiment of the present invention. The operations of the apparatuses for detecting an optical line fault in a PON according to the first and second embodiments of the present invention will be identical to each other, and thus the description of the flowchart shown in FIG. 3 will be made based on the configuration of the first embodiment.

First, the OLT 200*a* of the central base station 200 outputs downstream light ($\lambda_{down}$) having a predetermined wavelength, and the monitoring light generation device 200*b* outputs monitoring light ($\lambda_m$) having a predetermined wavelength at step S10.

The downstream light ($\lambda_{down}$) and the monitoring light ($\lambda_m$) are multiplexed by the coupler 200*c*, and a multiplexed signal is transmitted to the optical distribution unit 10 of the smart remote node 100. That is, the multiplexed signal (including the downstream light ($\lambda_{down}$) and the monitoring light ($\lambda_m$)) is distributed by the power splitter 11 to the monitoring light receiving filter unit 12 and to the optical layer management unit 20 at step S12.

The downstream light ($\lambda_{down}$) of the multiplexed signal distributed to the monitoring light receiving filter unit 12 passes through the monitoring light reflective filter unit 300 and is then transferred to the ONUs 400*a*, 400*b*, 400*c*, and 400*d*. The monitoring light ($\lambda_m$) of the multiplexed signal distributed to the monitoring light receiving filter unit 12 is reflected from the monitoring light reflective filter unit 300. The reflected monitoring light is input to the monitoring light receiver 25 of the optical layer management unit 20 via the monitoring light receiving filter unit 12 at step S14. Here, the reflected monitoring light may be referred to as "reflected light".

Meanwhile, the multiplexed signal distributed by the power splitter 11 to the optical layer management unit 20 is applied to the AWG 21. The AWG 21 transmits the downstream light of the multiplexed signal to the optical transceiver 22, and transmits the monitoring light of the multiplexed signal to the monitoring light receiver 23. The downstream light received by the optical transceiver 22 is terminated at the PON MAC unit 24, and is processed by the smart remote node control unit 26. The monitoring light received by the signal monitoring light receiver 23 is reflected and returned from each of the ONUs 400*a*, 400*b*, 400*c*, and 400*d* and then functions as a reference signal required to measure a monitoring light signal received by the monitoring light receiving unit 25. That is, when the monitoring light receiver 23 receives monitoring light, the smart remote node control unit 26 measures, from that point, the intensity and time of monitoring light (that is, reflected light) that has been reflected and received for each distribution network. Then, the smart remote node control unit 26 compares the measured monitoring light data with the pattern of monitoring light in a normal state (i.e., a signal in which no fault occurs in the link of each optical distribution network), and then analyzes and determines whether a fault has occurred in each distribution network at step S16.

Further, the smart remote node control unit 26 stores the results of determining whether a fault has occurred in each distribution network as distribution network status information at step S18.

Thereafter, the smart remote node control unit 26 periodically transmits the distribution network status information to the optical distribution network management device 600 at step S20. In this case, an in-band communication scheme is implemented in which the distribution network status information is transmitted to the optical distribution network management device 600 through the PON MAC unit 24.

Further, a method for measuring a fault in the feeder network is configured to determine that a fault in the feeder network has occurred when a monitoring light signal to be periodically received by the monitoring light receiver 23 is not received, and upstream light ($\lambda_{up}$) signals from all activated ONUs 400*a*, 400*b*, 400*c*, and 400*d* are not received by the OLT 200*a*. In this case, the central base station 200 may convert a measurement mode into an optical line fault measurement mode in a point-to-point OTDR scheme, thus determining the location of a fault in the feeder network.

Figure 4:
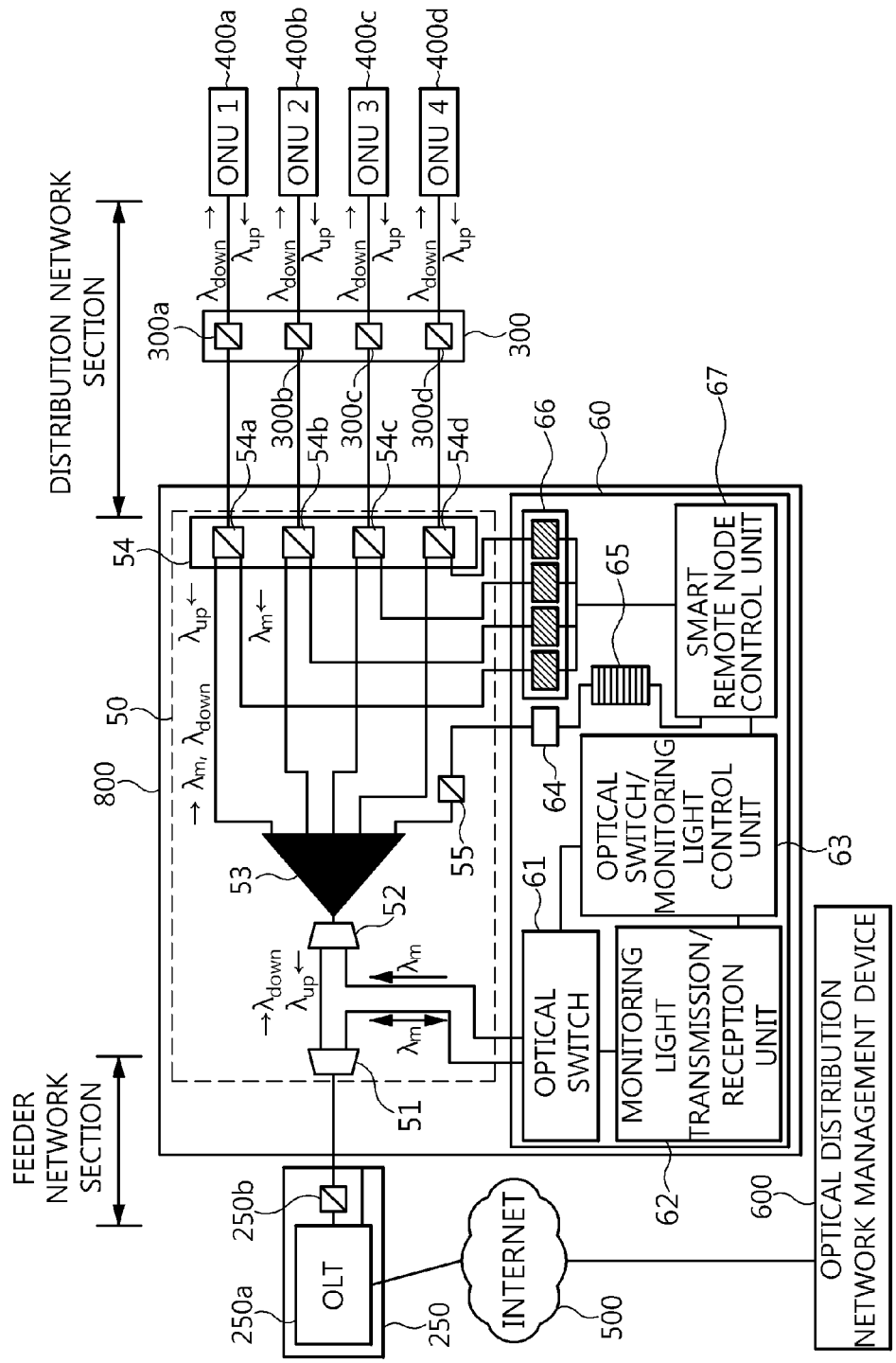
FIG. 4 is a diagram showing an apparatus for detecting an optical line fault in a PON according to a third embodiment of the present invention.

FIG. 4 is a diagram showing an apparatus for detecting an optical line fault in a PON according to a third embodiment of the present invention. The same reference numerals are used to designate the components of FIG. 4 identical to those of FIG. 1, and thus a repeated description thereof will be omitted.

The optical line fault detection apparatus according to the third embodiment of the present invention adopts the structure of a smart remote node based on in-band communication in which the monitoring light remote nodes are decentralized.

A smart remote node 800 shown in FIG. 4 may be the optical line fault detection apparatus according to the third embodiment of the present invention.

The smart remote node 800 includes an optical distribution unit 50 and an optical layer management unit 60.

In order to detect a fault in a distribution network section, the optical distribution unit 50 multiplexes downstream light and monitoring light, each having a predetermined wavelength, transmits a multiplexed signal to ONUs 400*a*, 400*b*, 400*c*, and 400, receives monitoring light reflected and returned from each of the ONUs 400*a*, 400*b*, 400*c*, and 400*d*, and provides the received monitoring light to the optical layer management unit 60. More specifically, the optical distribution unit 50 multiplexes downstream light ($\lambda_{down}$) from a central base station 250 and monitoring light ($\lambda_m$) generated by the optical layer management unit 60 to detect a fault in each distribution network, and distributes a multiplexed signal to the ONUs 400*a*, 400*b*, 400*c*, and 400*d* and to the optical layer management unit 60. Further, a monitoring light reflective filter unit 300 composed of monitoring light reflective filters 300*a*, 300*b*, 300*c*, and 300*d* is installed at the location previous to the ONUs 400*a*, 400*b*, 400*c*, and 400*d*. Accordingly, when the multiplexed signal is applied to the ONUs 400*a*, 400*b*, 400*c*, and 400*d*, the monitoring light signal of the multiplexed signal is reflected from the monitoring light reflective filter unit 300 and is returned to the optical distribution unit 50. Accordingly, the optical distribution unit 50 receives a returned monitoring light signal (also referred to as "reflected light") and transmits it to the optical layer management unit 60.

Meanwhile, in order to detect a fault in a feeder network section the optical distribution unit 50 multiplexes upstream light and monitoring light, each having a predetermined wavelength, transmits a multiplexed signal to the OLT 250*a*, receives monitoring light reflected and returned from the OLT 250*a*, and provides the received monitoring light to the optical layer management unit 60. More specifically, in order to detect a fault in the feeder network section, the optical distribution unit 50 multiplexes upstream light ($\lambda_{up}$) from each of the ONUs 400*a*, 400*b*, 400*c*, and 400*d* and monitoring light ($\lambda_m$) generated by the optical layer management unit 60, and transmits a multiplexed signal to the OLT 250*a*. A monitoring light reflective filter 250*b* is installed at the location previous to the OLT 250*a*, so that when the multiplexed signal is applied to the OLT 250*a*, the monitoring light signal of the multiplexed signal is reflected from the monitoring light reflective filter 250*b* and is then returned to the optical distribution unit 50. Accordingly, the optical distribution unit 50 receives the returned monitoring light signal (i.e., reflected light) and transmits it to the optical layer management unit 60.

In FIG. 4, although the OLT 250*a* and the monitoring light reflective filter 250*b* are shown as separate components, the monitoring light reflective filter 250*b* may be installed, for example, in a portion of the OLT 250*a*. In FIG. 4, the OLT 250*a* and the monitoring light reflective filter 250*b* are installed in the central base station 250, and downstream light ($\lambda_{down}$) having a predetermined wavelength is output from the OLT 250*a*. Consequently, the central base station 250 of FIG. 4 may output downstream light.

Preferably, the optical distribution unit 50 includes a 1:2 branch first AWG 51, a 2:1 branch second AWG 52, a 1:N+1 branch power splitter 53, a monitoring light receiving filter unit 54 composed of monitoring light receiving filters 54*a*, 54*b*, 54*c*, and 54*d*, and a monitoring light blocking filter 55. The 1:2 branch first AWG 51 multiplexes a monitoring light signal so as to detect a fault in a feeder network section. The 2:1 branch second AWG 52 multiplexes a monitoring light signal so as to detect a fault in a distribution network section. The 1:N+1 branch power splitter 53 (where N denotes the number of ONUs, and N=4 in FIG. 4) distributes the multiplexed signal of the downstream light and the monitoring light to the distribution network section. The monitoring light receiving filters 54*a*, 54*b*, 54*c*, and 54*d* of the monitoring light receiving filter unit 54 receive monitoring light reflected and received from the ONUs 400*a*, 400*b*, 400*c*, and 400*d*, respectively, and perform 2:1 branching. The monitoring light blocking filter 55 blocks the wavelength of the monitoring light from the multiplexed signal input through the power splitter 53.

In the above-described smart remote node 800, the optical distribution unit 50 including the first AWG 51, the second AWG 52, the monitoring light receiving filter unit 54, the power splitter 53, and the monitoring light blocking filter 55 may be integrated into a Planar Lightwave Circuit (PLC) chipset and implemented as a single chipset. Accordingly, the structure of the optical distribution unit 50 may be simplified and economically produced.

Meanwhile, the optical layer management unit 60 switches a current mode to any one of a fault detection mode for the distribution network section and a fault detection mode for the feeder network section. Further, in the fault detection mode for the distribution network section, the optical layer management unit 60 may compare data, obtained by measuring the intensity and time of the monitoring light reflected and returned from each of the ONUs 400a, 400b, 400c, and 400d, with the pattern of a monitoring light signal in a normal state (i.e., a monitoring light signal measured when no fault occurs in the link of each optical distribution network), and then analyze and determine whether a fault has occurred in each distribution network. Meanwhile, in the fault detection mode for the feeder network section, the optical layer management unit 60 may compare data, obtained by measuring the intensity and time of monitoring light reflected and returned from the OLT 250a, with the pattern of a monitoring light signal in a normal state (that is, a monitoring light signal measured when no fault occurs in the link of the feeder network), and then analyze and determine whether a fault has occurred in the feeder network.

Here, the optical layer management unit 60 includes a 1×2 optical switch 61, a monitoring light transmission/reception unit 62, an optical switch/monitoring light control unit 63, an optical transceiver 64, a PON MAC unit 65, monitoring light receivers 66, and a smart remote node control unit 67. The 1×2 optical switch 61 is capable of selectively switching between a feeder network section and a distribution network section. The monitoring light transmission/reception unit 62 transmits and receives monitoring light. The optical switch/monitoring light control unit 63 operates the monitoring light transmission/reception unit 62 in a transmission mode while switching the optical switch 61 to a fault detection mode for a distribution network section, upon detecting a fault in the distribution network section, and operates the monitoring light transmission/reception mode 62 in a transmission/reception mode while switching the optical switch 61 to a fault detection mode for the feeder network section, upon detecting a fault in the feeder network section. The optical transceiver 64 receives data (downstream light) having passed through the monitoring light blocking filter 55 and transmits data (i.e., distribution network status information and feeder network status information). The PON MAC unit 65 transmits and receives data (for in-band communication). The monitoring light receivers 66 receive monitoring light for respective distribution networks. The smart remote node control unit 67 analyzes and determines whether a fault has occurred in each distribution network by comparing the monitoring light received from the monitoring light receivers 66 with monitoring light in a normal state (reference signal), and analyzes and determines whether a fault has occurred in the feeder network by comparing the monitoring light received by the monitoring light transmission/reception unit 62 with monitoring light in a normal state.

The monitoring light transmitted from the monitoring light transmission/reception unit 62 uses a monitoring light wavelength ($\lambda_m$) differing from data wavelengths ($\lambda_{down}$ and $\lambda_{up}$) used between the OLT 250a and the ONUs 400a, 400b, 400c, and 400d.

The smart remote node 800 of FIG. 4 based on in-band communication in which monitoring light remote nodes are decentralized is advantageous in that effective line monitoring is possible even in a long-range PON scheme of 40 km or more because monitoring light can be transmitted within the smart remote node 800. Further, there are advantages in that, in the case of the distribution network, monitoring light passes downstream only once through the second AWG 52 and the power splitter 53, thus reducing optical loss, and in that the monitoring light receivers 66 are attached to respective distribution networks, thus precisely determining a fault in a specific distribution network. In the case of the feeder network, there is an advantage in that monitoring light passes only through the first AWG 51, thus reducing loss rate and enabling an existing point-to-point OTDR to be used.

Figure 5:
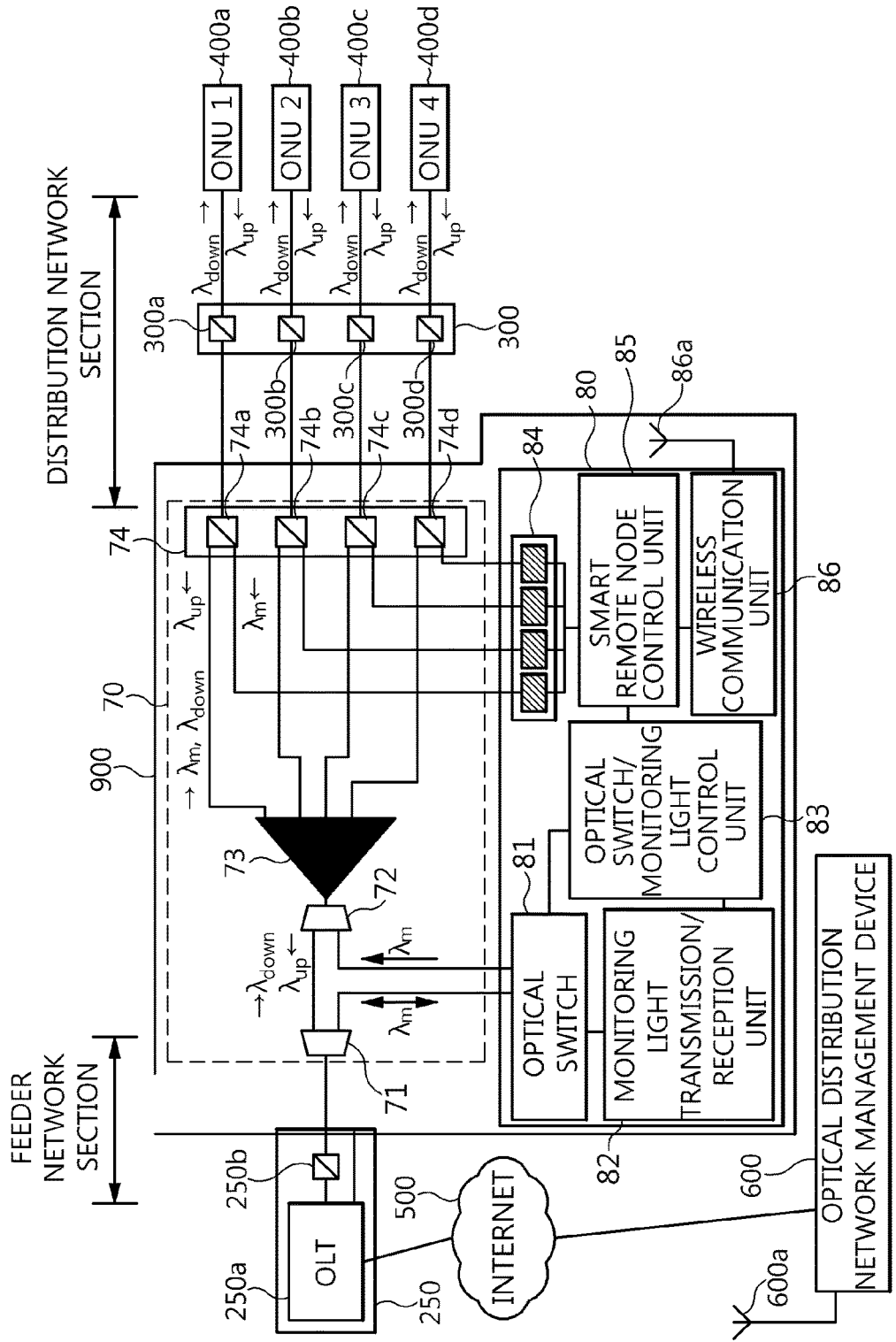
FIG. 5 is a diagram showing an apparatus for detecting an optical line fault in a PON according to a fourth embodiment of the present invention.

FIG. 5 is a diagram showing an apparatus for detecting an optical line fault in a PON according to a fourth embodiment of the present invention. The same reference numerals are used to designate the components of FIG. 5 identical to those of FIG. 4, and thus a repeated description thereof will be omitted.

There is a difference between the third and fourth embodiments of the present invention in that the optical line fault detection apparatus according to the third embodiment adopts the structure of a smart remote node based on in-band communication in which monitoring light remote nodes are decentralized, whereas the optical line fault detection apparatus according to the fourth embodiment adopts the structure of a smart remote node based on out-of-band communication in which monitoring light remote nodes are decentralized.

A smart remote node 900 shown in FIG. 5 may be the optical line fault detection apparatus according to the fourth embodiment of the present invention.

In the fourth embodiment, the smart remote node 900 is configured such that the monitoring light blocking filter 55, the optical transceiver 64 for data transmission/reception, and the PON MAC unit 65 of FIG. 4 are removed, and a wireless communication unit 86 is added.

That is, the smart remote node 900 includes an optical distribution unit 70 and an optical layer management unit 80.

Here, the optical distribution unit 70 includes a first AWG 71, a second AWG 72, a power splitter 73, and a monitoring light receiving filter unit 74 composed of monitoring light receiving filters 74a, 74b, 74c, and 74d.

Although the reference numerals of the first AWG 71, the second AWG 72, the power splitter 73, and the monitoring light receiving filter unit 74 composed of the filters 74a, 74b, 74c, and 74d in FIG. 5 are different from those of the first AWG 51, the second AWG 52, the power splitter 53, and the monitoring light receiving filter unit 54 composed of monitoring light receiving filters 54a, 54b, 54c, and 54d in FIG. 4, the corresponding components perform the same functions, respectively.

The optical layer management unit 80 switches a current mode to any one of a fault detection mode for a distribution network section and a fault detection mode for a feeder network section. Further, in the fault detection mode for the distribution network section, the optical layer management unit 80 may compare data, obtained by measuring the intensity and time of monitoring light reflected and returned from each of the ONUs 400a, 400b, 400c, and 400d, with the pattern of a monitoring light signal in a normal state (that is, a monitoring light signal measured when no fault occurs in the link of an optical distribution network), and then analyze and determine whether a fault has occurred in each distribution network. Meanwhile, in the fault detection mode for the feeder network section, the optical layer management unit 80 may compare data, obtained by measuring the intensity and time of monitoring light reflected and returned from the OLT 250a, with the pattern of a monitoring light signal in a normal state (that is, a monitoring light signal measured when no fault occurs in the link of the feeder network), and then analyze and determine whether a fault has occurred in the feeder network.

Here, the optical layer management unit 80 includes a 1×2 optical switch 81, a monitoring light transmission/reception unit 82, an optical switch/monitoring light control unit 83, monitoring light receivers 84, a smart remote node control unit 85, and a wireless communication unit 86. The 1×2 optical switch 81 is capable of selectively switching between a feeder network section and a distribution network section. The monitoring light transmission/reception unit 82 transmits and receives monitoring light. The optical switch/monitoring light control unit 83 operates the monitoring light transmission/reception unit 82 in a transmission mode while switching the optical switch 81 to a fault detection mode for a distribution network section, upon detecting a fault in the distribution network section, and operates the monitoring light transmission/reception mode 82 in a transmission/reception mode while switching the optical switch 81 to a fault detection mode for the feeder network section, upon detecting a fault in the feeder network section. The monitoring light receivers 84 receive monitoring light for respective distribution networks. The smart remote node control unit 85 analyzes and determines whether a fault has occurred in each distribution network by comparing the monitoring light received from the monitoring light receivers 84 with monitoring light in a normal state (reference signal), and analyzes and determines whether a fault has occurred in the feeder network by comparing the monitoring light received by the monitoring light transmission/reception unit 82 with monitoring light in a normal state (reference signal). The wireless communication unit 86 wirelessly transmits the status information of each distribution network and the status information of the feeder network, which indicate the results of analysis by the smart remote node control unit 85, in real time to the optical distribution network management device 600.

The wireless communication unit 86 transmits only status information which is newly updated to the optical distribution network management device 600 over a cellular network.

For wireless communication, the wireless communication unit 86 may include an antenna 86*a*, and the optical distribution network management device 600 may also include an antenna 600*a*.

Figure 6:
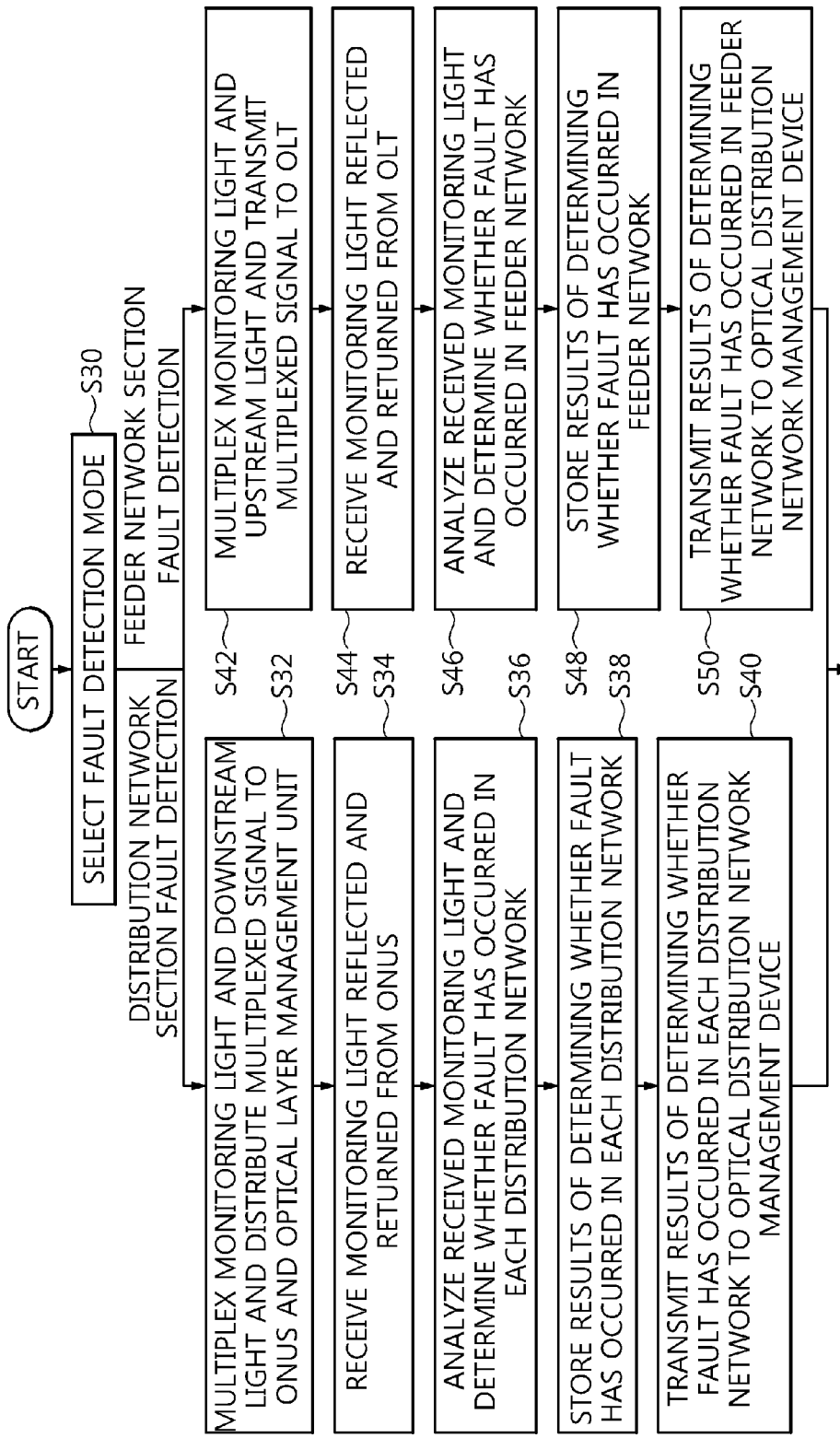
FIG. 6 is a flowchart showing the operation of the apparatus for detecting an optical line fault in a PON according to the third or fourth embodiment of the present invention.

FIG. 6 is a flowchart showing the operation of the apparatus for detecting an optical line fault in a PON according to the third or fourth embodiment of the present invention. The operations of the apparatuses for detecting an optical line fault in a PON according to the third and fourth embodiments of the present invention will be identical to each other, and thus the description of the flowchart shown in FIG. 6 will be made based on the configuration of the third embodiment.

First, a procedure for detecting a fault in a distribution network section will be described below.

The optical switch/monitoring light control unit 63 switches the optical switch 61 to a fault detection mode for the distribution network section so as to detect a fault in the distribution network section at step S30. Further, the optical switch/monitoring light control unit 63 operates the function of the monitoring light transmission/reception unit 62 only in a monitoring light transmission mode so that the reception of the monitoring light can be performed only by the monitoring light receivers 66.

Accordingly, by the second AWG 52, monitoring light (also referred to as "monitoring light wavelength") from the monitoring light transmission/reception unit 62 is multiplexed with downstream light (also referred to as "downstream light wavelength") from the OLT 250*a*. A multiplexed signal (including the downstream light ($\lambda_{down}$) and the monitoring light ($\lambda_m$)) is distributed by the power splitter 53 to the monitoring light receiving filter unit 54 at step S32. In this case, the distribution to the monitoring light receiving filter unit 54 may be regarded as indicating distribution to the ONUs 400*a*, 400*b*, 400*c*, and 400*d*.

The downstream light of the multiplexed signal distributed to the monitoring light receiving filter unit 54 is transferred to the ONUs 400*a*, 400*b*, 400*c*, and 400*d*, and the monitoring light of the multiplexed signal is reflected from the monitoring light reflective filter unit 300. The reflected monitoring light is received by the monitoring light receivers 66 through the monitoring light receiving filter unit 54 at step S34.

Meanwhile, the monitoring light of the multiplexed signal distributed to the optical layer management unit 60 is blocked by the monitoring light blocking filter 55 and only data wavelength is applied to the optical transceiver 64. The data wavelength (i.e., the wavelength of downstream light of the OLT) received by the optical transceiver 64 is terminated at the PON MAC unit 65 and is processed by the smart remote node control unit 67.

The optical switch/monitoring light control unit 63 notifies the smart remote node control unit 67 that the monitoring light signal has been transmitted. From that point, the monitoring light receiver 66 measures the intensity and time of the monitoring light. Further, the monitoring light data measured by the smart remote node control unit 67 is compared with the pattern of monitoring light in a normal state, and then whether a fault has occurred in each distribution network is analyzed and determined at step S36.

Thereafter, the smart remote node control unit 67 stores the results of determining whether a fault has occurred in each distribution network as distribution network status information at step S38.

Thereafter, the smart remote node control unit 67 periodically transmits the distribution network status information to the optical distribution network management device 600 at step S40. In this case, an in-band communication scheme is implemented in which the distribution network status information is transmitted to the optical distribution network management device 600 through the PON MAC unit 65.

Next, a procedure for detecting a fault in a feeder network section will be described below.

The optical switch/monitoring light control unit 63 switches the optical switch 61 to a fault detection mode for a feeder network section so as to detect a fault in the feeder network section at step S30. Further, in the fault detection mode for the feeder network section, the optical switch/monitoring light control unit 63 operates the function of the monitoring light transmission/reception unit 62 in a monitoring light transmission/reception mode so that the monitoring light transmission/reception unit 62 can perform both the transmission and reception of monitoring light.

Accordingly, by the first AWG 51, the monitoring light (also referred to as "monitoring light wavelength") from the monitoring light transmission/reception unit 62 is multiplexed with upstream light (also referred to as "upstream light wavelength") from each of the ONUs 400*a*, 400*b*, 400*c*, and 400*d*. A multiplexed signal (including the upstream light ($\lambda_{up}$) and the monitoring light ($\lambda_m$)) is applied to the OLT 250*a* at step S42.

The upstream light of the multiplexed signal is transferred to the OLT 250*a* and the monitoring light of the multiplexed signal is reflected from the monitoring light reflective filter 250*b*. The reflected monitoring light is received by the monitoring light transmission/reception unit 62 via the first AWG 51 and the optical switch 61 at step S44.

Accordingly, the monitoring light transmission/reception unit 62 measures the intensity and time of the received monitoring light and transfers measured monitoring light data to the smart remote node control unit 67. The smart remote node control unit 67 compares the measured monitoring light data with the pattern of monitoring light in a normal state and then analyzes and determines whether a fault has occurred in the feeder network at step S46.

Thereafter, the smart remote node control unit 67 stores the results of determining whether a fault has occurred in the feeder network as feeder network status information at step S48.

Thereafter, the smart remote node control unit 67 periodically transmits the feeder network status information to the optical distribution network management device 600 at step S50. In this case, an in-band communication scheme is implemented in which the feeder network status information is transmitted to the optical distribution network management device 600 through the PON MAC unit 65.

In accordance with the present invention having the above configuration, monitoring light receivers are mounted in distribution networks for respective subscribers of a smart remote node, received monitoring light is analyzed to detect a fault, and detected fault information is transmitted to an Optical Distribution Network (ODN) management device, thus solving the problems of conventional technology, such as difficulty in the identification of monitoring light signals attributable to loss occurring in an optical line and a remote node and the overlapping of monitoring light waveforms caused by ONUs present at the same distance.

Further, an optical layer management function is combined with a remote node that becomes gradually intelligent, thus exhibiting greater advantages in a long-range PON structure of 40 km or longer and a high-branch-type PON structure having 512 or more branches in the future.

Meanwhile, in the proposed smart remote node (RN) structure, the optical distribution device may be integrated into a PLC chip, so that a simple and economic system may be developed. In particular, even if electricity is not applied to the smart remote node, data communication between an OLT and ONUs is never influenced by the non-presence of electricity.

As described above, optimal embodiments of the present invention have been disclosed in the drawings and the specification. Although specific terms have been used in the present specification, these are merely intended to describe the present invention and are not intended to limit the meanings thereof or the scope of the present invention described in the accompanying claims. Therefore, those skilled in the art will appreciate that various modifications and other equivalent embodiments are possible from the embodiments. Therefore, the technical scope of the present invention should be defined by the technical spirit of the claims.

What is claimed is:

1. An apparatus for detecting an optical line fault in a Passive Optical Network (PON), comprising:
    an optical distribution unit configured to, when a multiplexed signal of a downstream light signal and a monitoring light signal is input, distribute the multiplexed signal to an Optical Network Unit (ONU) of a first optical path and to a second optical path; and
    an optical layer management unit installed in the second optical path, and configured to set a time at which the monitoring light signal of the multiplexed signal provided to the second optical path is received to a starting time of monitoring light measurement, compare a monitoring light signal reflected and returned from the ONU with a signal pattern obtained when no fault occurs, and then determine whether a fault has occurred in a distribution network,
    wherein the optical distribution unit comprises a power splitter and a monitoring light receiving filter unit,
    the power splitter transmits the multiplexed signal both to the monitoring light receiving filter unit and to the optical layer management unit, and
    the monitoring light receiving filter unit transmits the multiplexed signal received from the power splitter to the ONU, and transmits a monitoring light signal reflected and returned from the ONU to the optical layer management unit.

2. The apparatus of claim 1, wherein the optical distribution unit including the power splitter and the monitoring light receiving filter unit is integrated into a Planar Lightwave Circuit (PLC) chipset and implemented as a single chipset.

3. The apparatus of claim 1, wherein the optical layer management unit uses the monitoring light signal of the multiplexed signal provided to the second optical path as a reference signal at the measurement starting time, compares data obtained by measuring intensity and time of the monitoring light signal reflected and returned from the ONU with a pattern of a monitoring light signal measured when no fault occurs, and then determines whether a fault has occurred in the distribution network.

4. The apparatus of claim 1, wherein the optical layer management unit stores results of determining whether a fault has occurred in the distribution network, and transmits the determination results to an optical distribution network management device.

5. The apparatus of claim 4, wherein the optical layer management unit comprises a PON Media Access Control (MAC) unit to transmit the results of determining whether a fault has occurred in the distribution network to the optical distribution network management device via in-band signaling.

6. The apparatus of claim 4, wherein the optical layer management unit comprises a wireless communication unit to transmit the results of determining whether a fault has occurred in the distribution network to the optical distribution network management device via out-of-band signaling.

7. The apparatus of claim 1, wherein:
    the downstream light signal is output from an Optical Line Terminal (OLT) in a central base station, and
    the monitoring light signal is output from a monitoring light generation device in the central base station.

8. An apparatus for detecting an optical line fault in a Passive Optical Network (PON), comprising:
    an optical distribution unit configured to multiplex a downstream light signal and a monitoring light signal, transmit a multiplexed signal to an Optical Network Unit (ONU) of a first optical path, and transmit a monitoring light signal reflected and returned from the ONU to a second optical path in order to detect a fault in a distribution network, and configured to multiplex an upstream light signal from the ONU and the monitoring light signal, transmit a multiplexed signal to an Optical Line Terminal (OLT), and transmit a monitoring light signal reflected and returned from the OLT to the second optical path in order to detect a fault in a feeder network; and
    an optical layer management unit installed in the second optical path, and configured to switch a current mode to any one of a fault detection mode for the distribution network and a fault detection mode for the feeder network, wherein the optical layer management unit compares the reflected and returned monitoring light signal with a pattern of a monitoring light signal measured when no fault occurs, and then determines whether a fault has occurred in the distribution network and in the feeder network, wherein the optical distribution unit comprises:
a first Arrayed Waveguide Grating (AWG) for multiplexing the upstream light signal and the monitoring light signal to detect a fault in the feeder network;
a second AWG for multiplexing the downstream light signal and the monitoring light signal to detect a fault in the distribution network;
a power splitter for distributing the signal multiplexed by the second AWG to the distribution network;
a monitoring light receiving filter for receiving the monitoring light signal reflected and returned from the ONU and providing the received monitoring light signal to the optical layer management unit; and
a monitoring light blocking filter for blocking wavelength of monitoring light of the multiplexed signal input through the power splitter.

9. The apparatus of claim 8, wherein the optical distribution unit including the first AWG, the second AWG, the monitoring light receiving filter, the power splitter, and the monitoring light blocking filter is integrated into a Planar Lightwave Circuit (PLC) chip and implemented as a single chipset.

10. The apparatus of claim 8, wherein the optical layer management unit uses the monitoring light signal used for multiplexing as a reference signal at measurement starting time, compares data obtained by measuring intensity and time of the reflected and returned monitoring light signal with a pattern of a monitoring light signal measured when no fault occurs, and then determines whether a fault has occurred in the distribution network and in the feeder network.

11. The apparatus of claim 8, wherein the optical layer management unit stores results of determining whether a fault has occurred in the distribution network and in the feeder network, and transmits the determination results to an optical distribution network management device.

12. The apparatus of claim 8, wherein the optical layer management unit comprises:
an optical switch configured to switch to any one of a fault detection mode for the distribution network and a fault detection mode for the feeder network; and
a PON MAC unit configured to transmit information about results of determining whether a fault has occurred in the distribution network and in the feeder network to an optical distribution network management device via in-band signaling.

13. The apparatus of claim 8, wherein the optical layer management unit comprises:

an optical switch configured to switch to any one of a fault detection mode for the distribution network and a fault detection mode for the feeder network; and
a wireless communication unit configured to transmit information about results of determining whether a fault has occurred in the distribution network and in the feeder network to an optical distribution network management device via out-of-band signaling.

14. The apparatus of claim 8, wherein:
the downstream light signal is output from an OLT in a central base station, and
the monitoring light signal is output from the optical layer management unit.

15. A method for detecting an optical line fault in a Passive Optical Network (PON), comprising:
switching, by an optical layer management unit, a current mode to any one of a fault detection mode for a distribution network and a fault detection mode for a feeder network;
when the current mode switches to the fault detection mode for the distribution network, multiplexing, by an optical distribution unit, a downstream light signal and a monitoring light signal, transmitting a multiplexed signal to an Optical Network Unit (ONU), and transmitting a monitoring light signal reflected and returned from the ONU to the optical layer management unit;
when the current mode switches to the fault detection mode for the feeder network, multiplexing, by the optical distribution unit, an upstream light signal from the ONU and the monitoring light signal, transmitting a multiplexed signal to an Optical Line Terminal (OLT), and transmitting a monitoring light signal reflected and returned from the OLT to the optical layer management unit; and
comparing, by the optical layer management unit, the reflected and returned monitoring light signal with a pattern of a monitoring light signal measured when no fault occurs, thus determining whether a fault has occurred in the distribution network and in the feeder network.

16. The method of claim 15, further comprising transmitting, by the optical layer management unit, results of determining whether a fault has occurred in the distribution network and in the feeder network to an optical distribution network management device via in-band signaling.

17. The method of claim 15, further comprising transmitting, by the optical layer management unit, results of determining whether a fault has occurred in the distribution network and in the feeder network to an optical distribution network management device via out-of-band signaling.

18. The method of claim 15, wherein:
the downstream light signal is output from an Optical Line Terminal (OLT) in a central base station, and
the monitoring light signal is output from the optical layer management unit.

* * * * *